No. 889,574. PATENTED JUNE 2, 1908.
G. W. BLANK.
LUBRICATOR.
APPLICATION FILED OCT. 19, 1907.
2 SHEETS—SHEET 2.
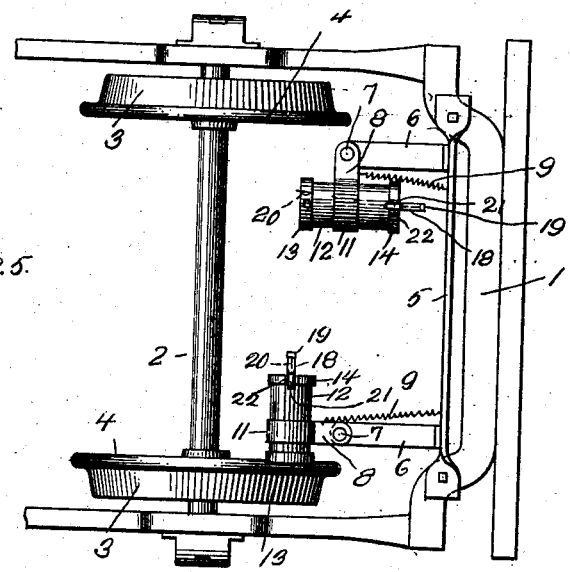
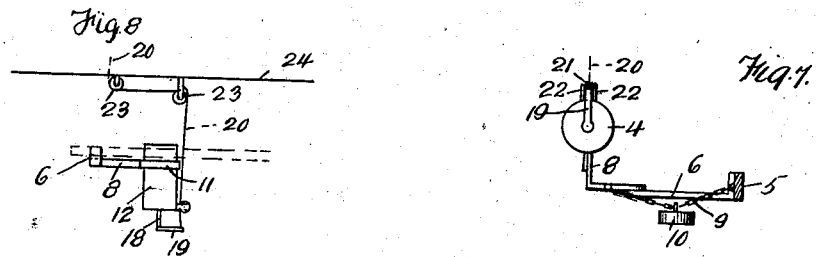
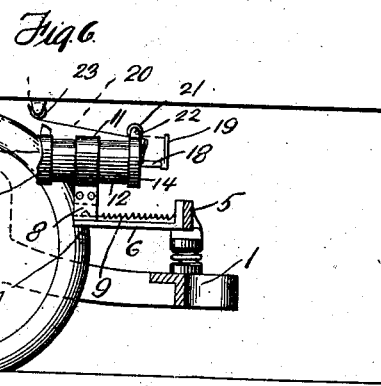
Witnesses
Samuel Payne
Inventor
George W. Blank.
By H. C. Evert & Co.
Attorneys

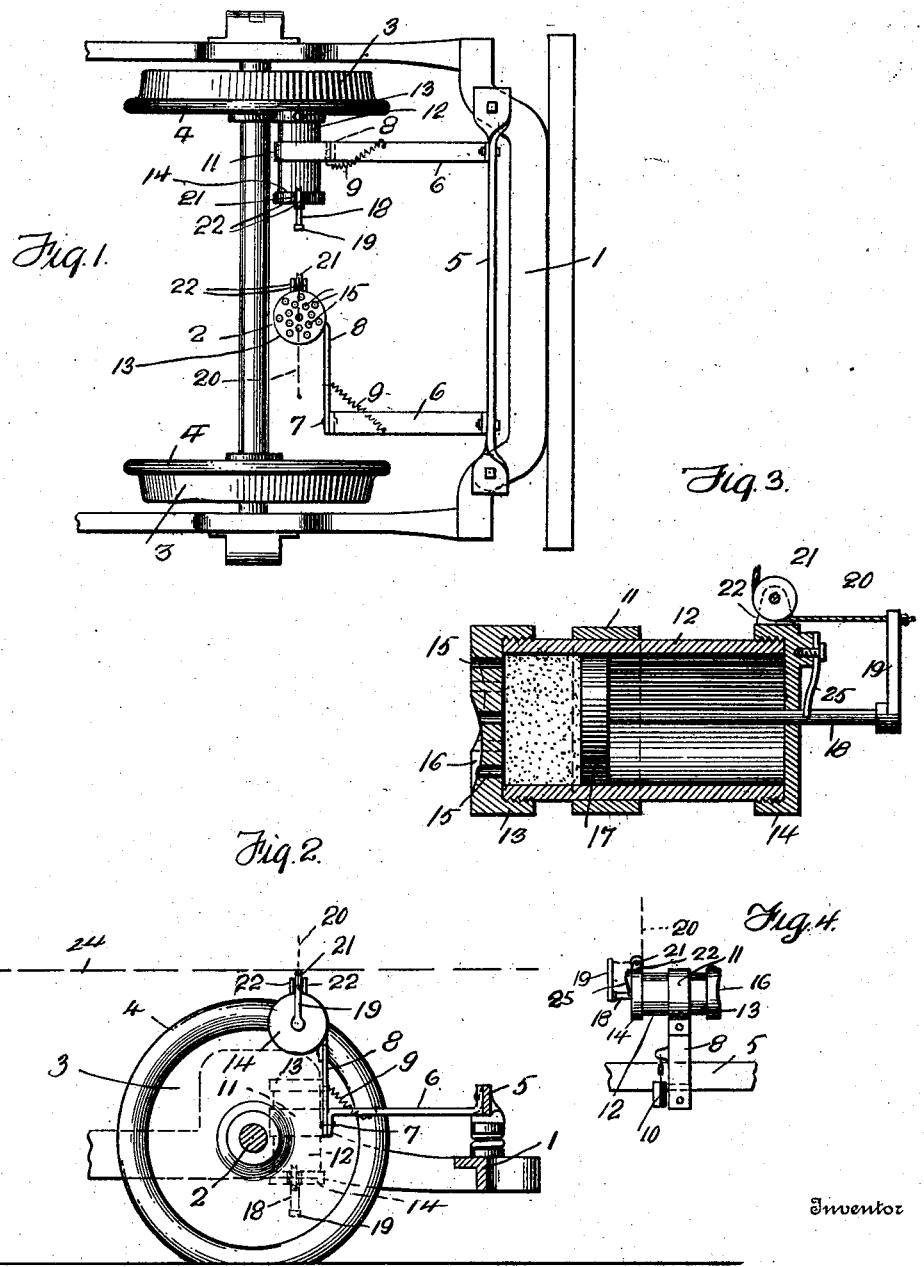

UNITED STATES PATENT OFFICE.

GEORGE W. BLANK, OF WILKINSBURG, PENNSYLVANIA.

LUBRICATOR.

No. 889,574.　　Specification of Letters Patent.　　Patented June 2, 1908.

Application filed October 19, 1907. Serial No. 398,177.

*To all whom it may concern:*

Be it known that I, GEORGE W. BLANK, a citizen of the United States, residing at Wilkinsburg, county of Allegheny, and State of Pennsylvania, have invented certain new and useful Improvements in Lubricators, of which the following is a specification, reference being had therein to the accompanying drawings.

This invention relates to lubricators designed for applying oil or grease to the flanges of car wheels.

The primary object of my invention is to provide a novel device by which the flanges of car wheels can be economically and effectually lubricated.

My invention aims to provide a device or novel equipment for cars, by virtue of which the flange of the wheel can be easily and quickly lubricated, while a wheel is in motion. In this connection, the invention is intended to reduce the amount of friction between a car wheel flange and a rail, especially upon curved sections of tracks, thereby reducing the wear and tear of a wheel flange and rail, and insuring safety of rolling stock. To this end, I have constructed a simple and inexpensive device applicable to various types of cars, the device being easily and quickly manipulated by the motorman or operator of a car, when it is desired to place hard grease, oil or a similar lubricant upon the flange of a car wheel. I am aware that similar devices have heretofore been devised for accomplishing this result, but these devices have been defective, due to the waste of lubricant, imperfect lubricant feeding means, and principally to clogging caused by the dust and dirt of a road bed when rolling stock is passing over the same.

The embodiments of my invention are illustrated in the accompanying drawings in which:

Figure 1 is a plan of a portion of a car truck, equipped with my improved devices, illustrating one of the devices contacting with one of the wheels of the truck, and another device out of contact with the other wheel of the truck, Fig. 2 is a longitudinal sectional view of the same, Fig. 3 is an enlarged longitudinal sectional view of a lubricant reservoir constituting part of a device, Fig. 4 is an elevation illustrating a modified form of means for normally holding the lubricant reservoir in an inoperative position, Fig. 5 is a plan of a truck equipped with a modification of my invention, Fig. 6 is a longitudinal sectional view of the same, Fig. 7 is an elevation of one of the modified devices, and Fig. 8 is a diagrammatical view illustrating a form of mechanism for actuating a lubricating device.

In the accompanying drawings, 1 designates the frame of a truck having an axle 2 journaled therein provided with wheels 3, said wheels having peripheral inner flanges 4.

In connection with each wheel of a car, I use a lubricating device, and to support such device in close proximity to each wheel, I provide the frame 1 of the truck with a suitable support 5, said support carrying brackets 6, which extend towards the axle 2 parallel with the inner sides of the wheels 3.

Pivotally connected to the inner ends of the brackets 6 as at 7 are shiftable arms 8, the said arms being normally held in a horizontal plane through the medium of the lubricant reservoirs to be hereinafter referred to and by the contractible springs 9, these springs having one end secured to the brackets 6 and the other ends secured to the arms 8 and so disposed that when the arms are shifted in one direction the springs will expand and when the arms are released after being shifted, the springs 9 in connection with the lubricant reservoirs will return the arms 8 to their normal or horizontal position, and in lieu of employing the springs 9 weights 10 can be secured to the arms as clearly shown in Fig. 4.

The arms 8 are provided with straps 11 which embrace the lubricant reservoirs or tanks. As shown the lubricant reservoirs or tanks are in the form of cylinders 12 provided with heads 13 and 14 threaded upon their ends. The straps 11 surround the cylinders 12 at points between the centers and the discharge ends thereof whereby the rear ends of the cylinders will overbalance the forward ends and which arrangement in connection with the pulling actions of the springs 9 or the weights 10 will cause the arms 8 to assume a horizontal position when the shifting means for the said arms to be hereinafter referred to is released. These reservoirs or tanks are adapted to contain a lubricant such as hard grease, and in order that said grease can be fed to the flanged periphery of the wheels, I provide the head 13 of each reservoir with a plurality of openings 15, also a concavity or groove 16 for receiving the curved flange of the wheel.

In each reservoir or tank I place a piston 17 having a piston rod 18 extending through the head 14. The piston rod 18 carries an arm 19 to which is connected a cable 20, said cable passing over a grooved pulley 21, journaled in brackets 22 carried by the head 14 of each reservoir or tank. The cable 20 passes upwardly over pulleys 23 and through the body of the car 24, whereby said cable can be manipulated by the motorman or operator of a car for moving the piston 17 and the reservoir as will presently appear.

The piston 17 is employed for feeding the hard grease or lubricant to the head 13, and to prevent said piston from receding, I attach a flat spring 25 to the head 14, said spring engaging the piston rod 18 and preventing a rearward movement of said rod, except when the spring 25 is removed, or raised from engagement with said piston rod.

The spring 9 and the weight 10 are adapted to retain the lubricant reservoir in a vertical position, preventing a waste of the lubricant contained within the reservoir. When it is desired to place a quantity of the contents of a reservoir upon the flange 4 of the wheel 3, the cable 20 is pulled which swings the reservoir to a horizontal position, causing the head 3 to contact with the flange 4 of the wheel 13. Simultaneous with this movement of the reservoir, the piston 17 is moved towards the head 13, forcing a quantity of the lubricant from the reservoir upon the flange 4 of the wheel 3. Upon the cable 20 being released, the reservoir immediately assumes its normal vertical position, but the piston rod 18 is held by the spring 20, thus preventing a receding movement of the piston 17.

From the above description taken in connection with the drawings, it will be observed that the lubricating device as described swings in a vertical plane, but owing to the peculiar construction of some cars and trucks it may not be possible to so move a lubricant reservoir. For this reason, I have constructed the device to swing upon a horizontal plane, as illustrated in Figs. 5 to 6 inclusive, the construction being practically the same, and the mechanism arranged to swing a reservoir in the proper direction to engage the flange of a wheel.

It is therefore evident that I have devised a novel swinging, manually operated lubricating device that can be used at any desired time, the device being normally maintained in an inactive position and manually thrown into an active position. By the simultaneous operation of feeding a lubricant from the reservoir, and of moving the reservoir in position to contact with the flange of the wheel, I reduce the number of structural elements of such device and insure positive means of ejecting a certain quantity of lubricant from the device.

I do not care to confine myself to the manner in which the devices are supported from a car, truck, body or frame, or to any structural changes as are permissible by the appended claims.

Having now described my invention what I claim as new, is:—

1. The combination with a truck and the flanged wheels thereof, of a support carried by said truck, brackets carried by said support, arms pivotally connected to said brackets, cylindrical reservoirs carried by said arms, detachable heads carried by said reservoirs, one of said heads having openings formed therein and a concavity for receiving the flange of a wheel, pistons mounted in said reservoirs, means for simultaneously moving said pistons and said reservoirs, means for preventing a receding movement of said pistons, and means for normally retaining said arms in a horizontal position.

2. The combination with a wheeled truck, of brackets supported from said truck, arms pivotally connected to said brackets, reservoirs carried by said arms, one end of each of said reservoirs having openings formed therein and a concavity for receiving the flange of a wheel, pistons mounted in said reservoirs, means for simultaneously moving said pistons and said reservoirs for lubricating the wheels of the truck, means for preventing a receding movement of said pistons, and means for normally retaining said arms in a horizontal position.

3. The combination with a truck and the flanged wheels thereof, of brackets supported from said truck, arms pivotally carried by said brackets, lubricant reservoirs carried by said arms, detachable heads carried by said reservoirs, one of said heads having a plurality of openings formed therein, and pistons arranged in said reservoirs for feeding the contents thereof from said reservoirs, means for simultaneously moving said reservoirs and said pistons, means for preventing a receding movement of said pistons, and means for normally holding said reservoirs out of contact with said wheels.

4. The combination with a truck and the flanged wheels thereof, of cylindrical reservoirs pivotally supported from said trucks, and adapted to engage said wheels, pistons arranged in said reservoirs for feeding the contents thereof on to said wheels, means for simultaneously moving said pistons, and said reservoirs, and means for normally holding said reservoirs out of engagement with said wheels.

5. The combination with a truck and the wheels thereof, of lubricant reservoirs pivotally supported adjacent to said wheels and adapted to contact therewith, pistons located in said reservoirs for forcing lubricant therefrom, means for simultaneously moving said pistons and said reservoirs, and means for normally holding said reservoirs out of contact with said wheels.

6. A lubricating device for wheels comprising a pivotally mounted lubricant reservoir adapted to contact with a wheel, a piston movably mounted in said reservoir for forcing the contents therefrom, means for simultaneously moving said reservoir and said piston, and means for normally holding said reservoir in an inactive position.

7. A lubricator of the type described comprising a pivoted lubricant reservoir provided with a piston, and means for simultaneously shifting said piston to discharge the contents of the reservoir and for moving said reservoir to an active position.

8. A lubricator of the type described comprising a reservoir normally supported in a vertical position and provided with a piston, and means for moving said reservoir to a horizontal position and for moving said piston to discharge the contents of the reservoir.

In testimony whereof I affix my signature in the presence of two witnesses.

GEORGE W. BLANK.

Witnesses:
 MAX H. SROLOVITZ,
 A. J. TRIGG.